US012497929B2

United States Patent
Okamoto

(10) Patent No.: US 12,497,929 B2
(45) Date of Patent: Dec. 16, 2025

(54) HYBRID VEHICLE

(71) Applicant: TOYOTA JIDOSHA KABUSHIKI KAISHA, Aichi-ken (JP)

(72) Inventor: Yuuta Okamoto, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 152 days.

(21) Appl. No.: 18/509,305

(22) Filed: Nov. 15, 2023

(65) Prior Publication Data

US 2024/0240596 A1 Jul. 18, 2024

(30) Foreign Application Priority Data

Jan. 12, 2023 (JP) ................. 2023-003066

(51) Int. Cl.
| | |
|---|---|
| *F02D 41/22* | (2006.01) |
| *B60W 20/10* | (2016.01) |
| *B60W 30/192* | (2012.01) |
| *F02D 41/04* | (2006.01) |
| *F02D 41/06* | (2006.01) |
| *G07C 5/08* | (2006.01) |

(52) U.S. Cl.
CPC ........... *F02D 41/22* (2013.01); *F02D 41/042* (2013.01); *F02D 41/068* (2013.01); *G07C 5/0808* (2013.01); *B60W 20/10* (2013.01); *B60W 30/192* (2013.01); *B60W 2510/0638* (2013.01); *B60W 2710/0644* (2013.01); *F02D 2200/101* (2013.01)

(58) Field of Classification Search
CPC ...... F02D 41/22; F02D 41/042; F02D 41/068; F02D 2200/101; F02D 29/02; F02D 41/08; G07C 5/0808; B60W 20/10; B60W 30/192; B60W 2510/0638; B60W 2710/0644; B60W 2050/0083; B60W 2050/022; B60W 2510/0676; B60W 20/50; B60W 10/06; B60W 2710/06; B60K 6/445
See application file for complete search history.

(56) References Cited

U.S. PATENT DOCUMENTS

| | | | |
|---|---|---|---|
| 2015/0088405 A1* | 3/2015 | Iijima | B60K 6/48 701/112 |
| 2017/0282892 A1* | 10/2017 | Endo | B60K 6/445 |
| 2019/0323470 A1* | 10/2019 | Namuduri | F02N 11/0818 |
| 2020/0317214 A1* | 10/2020 | Yonezawa | B60W 10/06 |
| 2022/0126815 A1* | 4/2022 | Bailey | B60W 20/20 |

FOREIGN PATENT DOCUMENTS

JP 2019183653 A * 10/2019

* cited by examiner

*Primary Examiner* — Anne Marie Antonucci
*Assistant Examiner* — Luis G Del Valle
(74) *Attorney, Agent, or Firm* — HAUPTMAN HAM, LLP

(57) ABSTRACT

A hybrid vehicle includes an engine, a motor, and a control device configured to control the engine. The control device includes an intermittent operation control unit, a feedback control unit, a calculation unit, a determination unit, a continuation unit, and a diagnosis unit.

5 Claims, 4 Drawing Sheets

HYBRID VEHICLE

CROSS-REFERENCE TO RELATED APPLICATION

This application is based upon and claims the benefit of priority of the prior Japanese Patent Application No. 2023-003066, filed on Jan. 12, 2023, the entire contents of which are incorporated herein by reference.

TECHNICAL FIELD

The present disclosure relates to a hybrid vehicle.

BACKGROUND

During idle operation of an engine, a control value of the engine is feedback-controlled so that an actual rotational speed of the engine becomes a target idle rotational speed. An abnormality diagnosis of the engine is executed after completion of warm-up of the engine (see, for example, Japanese Unexamined Patent Application Publication No. 2019-183653).

In a hybrid vehicle, an intermittent operation in which the engine is automatically stopped and automatically started during traveling by a motor is executed. When the automatic stop of the engine is frequently executed in this way, an execution frequency of the abnormality diagnosis, which is required by, for example, regulations, might not be ensured.

SUMMARY

It is therefore an object of the present disclosure to provide a hybrid vehicle in which an execution frequency of an abnormality diagnosis of an engine is ensured.

The above object is achieved by a hybrid vehicle including: an engine; a motor; and a control device configured to control the engine, wherein the control device includes: an intermittent operation control unit configured to automatically stop and automatically start the engine during traveling by the motor; a feedback control unit configured to execute feedback control to control a control value of the engine such that an actual rotational speed of the engine becomes a target idle rotational speed during an idle operation of the engine; a calculation unit configured to calculate a difference between the actual rotational speed and the target idle rotational speed during execution of the feedback control; a determination unit configured to determine whether or not a magnitude of the difference is greater than a first upper limit value of a range indicating that the engine is normal; a continuation unit configured to continue operation of the engine regardless of presence or absence of a request for automatic stop of the engine, when an affirmative determination is made by the determination unit; and a diagnosis unit configured to execute an abnormality diagnosis of the engine, after completion of warm-up of the engine.

The intermittent operation control unit may be configured to automatically stop the engine, when a negative determination is made by the determination unit and there is a request for automatic stop of the engine.

The control device may include a learning unit configured to execute learning of the control value, and the diagnosis unit may be configured to execute the abnormality diagnosis of the engine, after completion of warm-up of the engine and after learning of the control value.

The diagnosis unit may be configured to execute the abnormality diagnosis of the engine based on whether or not the magnitude of the difference after completion of warm-up of the engine is larger than a second upper limit value of a range indicating that the engine is normal.

DETAILED DESCRIPTION

[Schematic Configuration of Hybrid Vehicle]

Figure 1:
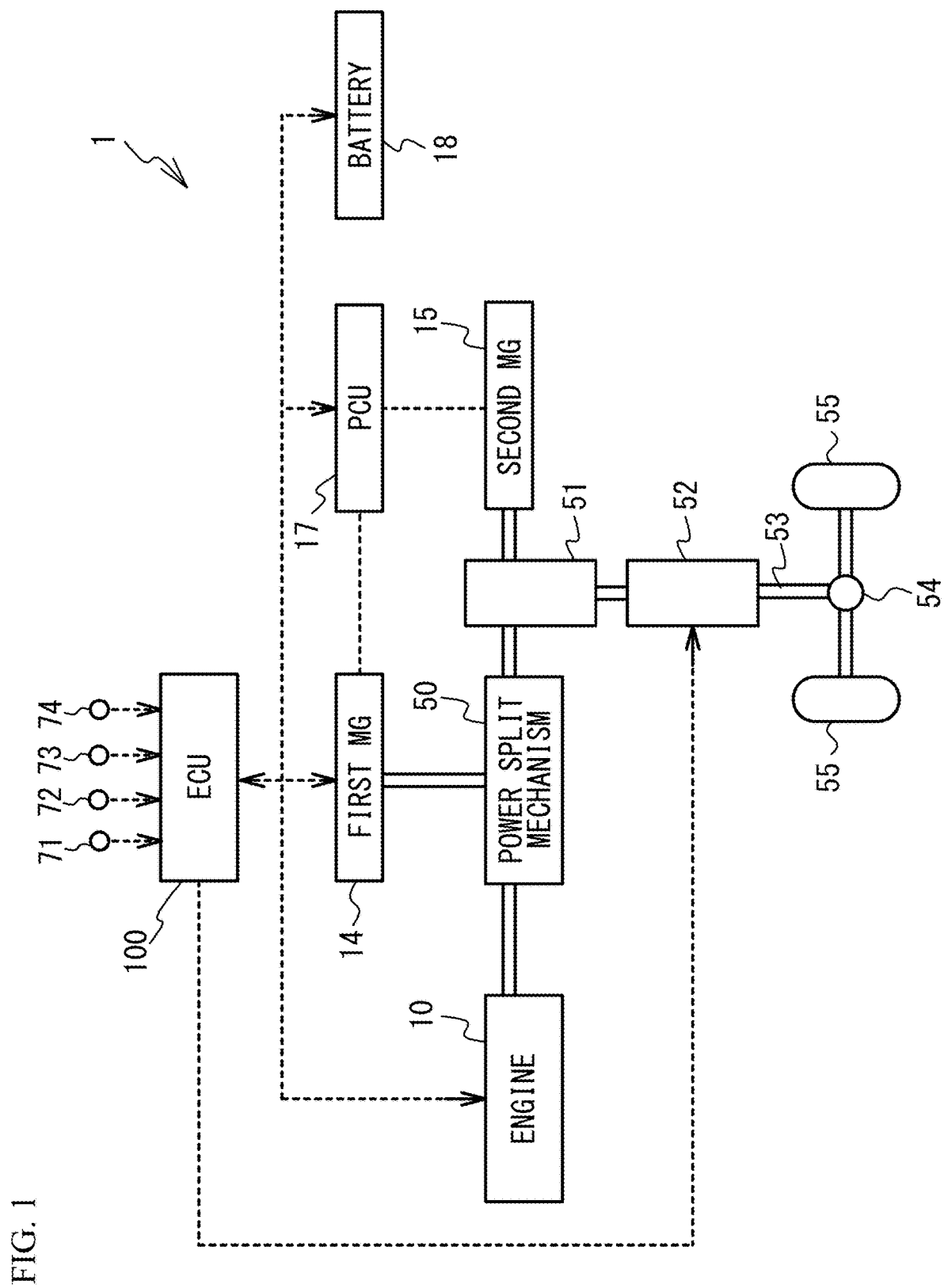
FIG. 1 is a schematic configuration view of a hybrid vehicle.

FIG. 1 is a schematic configuration view of a hybrid vehicle 1 according to the present embodiment. The hybrid vehicle 1 includes an Electronic Control Unit (ECU) 100, an engine 10, a first motor generator (hereinafter referred to as "first MG") 14, a second motor generator (hereinafter referred to as "second MG") 15, a Power Control Unit (PCU) 17, a battery 18, a power split mechanism 50, a transmitting mechanism 51, a transmission 52, a drive shaft 53, a differential gear 54, and drive wheels 55. The engine 10 is a gasoline engine, but is not limited to this and may be a diesel engine. The engine 10, the first MG 14, and the second MG 15 are power sources for traveling of the hybrid vehicle 1.

Each of the first MG 14 and the second MG 15 has a function as a motor that outputs torque by electric power supply and a function as a power generator that generates regenerative electric power by applying torque. The first MG 14 and the second MG 15 are electrically connected to the battery 18 via the PCU 17. The PCU 17 supplies power from the battery 18 to the first MG 14 or the second MG 15. The PCU 17 causes the battery 18 to receive regenerative electric power generated in the first MG 14 or the second MG 15.

The power split mechanism 50 mechanically couples the crankshaft of the engine 10, the rotation shaft of the first MG 14, and the power split mechanism 50. An output shaft of the power split mechanism 50 is coupled to the transmitting mechanism 51. The rotation shaft of the second MG 15 is coupled to the transmitting mechanism 51. The transmitting mechanism 51 is coupled to the transmission 52. The transmission 52 is coupled to the drive shaft 53. Each driving force of the engine 10, the first MG 14, and the second MG 15 is transmitted to the drive wheels 55 via the transmitting mechanism 51, the transmission 52, the drive shaft 53, and the differential gear 54. The transmission 52 is a stepped automatic shifting device provided between the second MG 15 and the drive shaft 53.

The ECU 100 is an electronic control unit that includes an arithmetic process circuit that executes various types of arithmetic processes related to travel control of the vehicles and a memory that stores control programs and date. The ECU 100 is an example of a control device. The ECU 100 functionally realizes an intermittent operation control unit, a feedback control unit, a calculation unit, a determination unit, a continuation unit, a learning unit, and a diagnostic unit, which will be described later.

Signals from an ignition switch 71, a water temperature sensor 72, a crank angle sensor 73, and an air flow meter 74 are input to the ECU 100. The ignition switch 71 detects ON/OFF of the ignition. The water temperature sensor 72 detects a temperature of a coolant of the engine 10. The crank angle sensor 73 detects an engine rotational speed that is a rotational speed of a crankshaft of the engine 10. The air flow meter 74 detects the amount of intake air introduced into the engine 10.

[Schematic Configuration of Engine]

Figure 2:
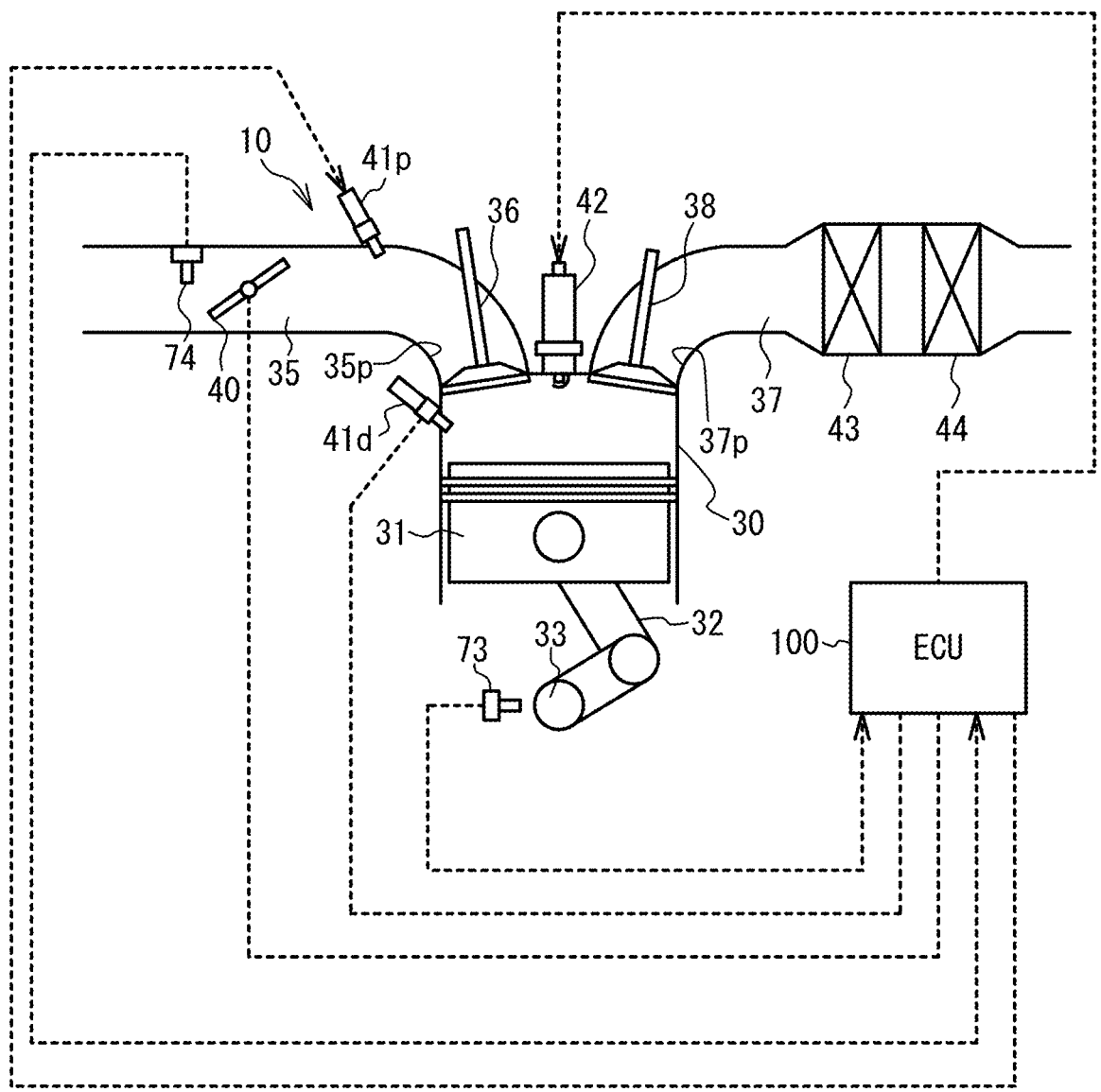
FIG. 2 is a schematic configuration view of an engine.

FIG. 2 is a schematic configuration view of the engine 10. The engine 10 includes a cylinder 30, a piston 31, a connecting rod 32, a crankshaft 33, an intake passage 35, intake valves 36, an exhaust passage 37, and exhaust valves 38. FIG. 2 illustrates the cylinder 30 among a plurality of cylinders included in the engine 10. The air-fuel mixture is burned in the cylinder 30. The piston 31 is accommodated in the cylinder 30 so as to reciprocate therein. The piston 31 is connected to the crankshaft 33 via the connecting rod 32. The connecting rod 32 converts the reciprocating motion of the piston 31 into rotational motion of the crankshaft 33.

The cylinder 30 is provided with an in-cylinder injector 41*d*. A port injector 41*p* is provided in the intake passage 35. The cylinder 30 is provided with an ignition device 42 that ignites an air-fuel mixture of intake air and fuel by spark discharge.

The intake passage 35 is connected to intake ports 35*p* of the cylinders 30 via the intake valves 36. The exhaust passage 37 is connected to exhaust ports 37*p* of the cylinders 30 via the exhaust valves 38. The air flow meter 74 described above and a throttle valve 40 that controls the intake air amount are provided in the intake passage 35. The throttle valve 40 can increase or decrease the amount of intake air introduced into the cylinder 30. The exhaust passage 37 is provided with a catalyst 43 and a filter 44.

The ECU 100 automatically stops and automatically starts the engine 10 during traveling by the power of at least one of the first MG 14 and the second MG 15. For example, when the charged amount of the battery 18 becomes greater than or equal to a threshold value during traveling by the first MG 14 and the engine 10, the engine 10 is automatically stopped, and the hybrid vehicle 1 travels by the first MG 14. When the charged amount of the battery 18 becomes less than a threshold value during traveling by the first MG 14, the engine 10 is automatically started, and the hybrid vehicle 1 travels by the first MG 14 and the engine 10. In this way, the ECU 100 executes intermittent operation control for automatically stopping and automatically starting the engine 10. The above-described control is an example of control executed by the intermittent operation control unit.

[Abnormality Diagnosis Process]

Figure 3:
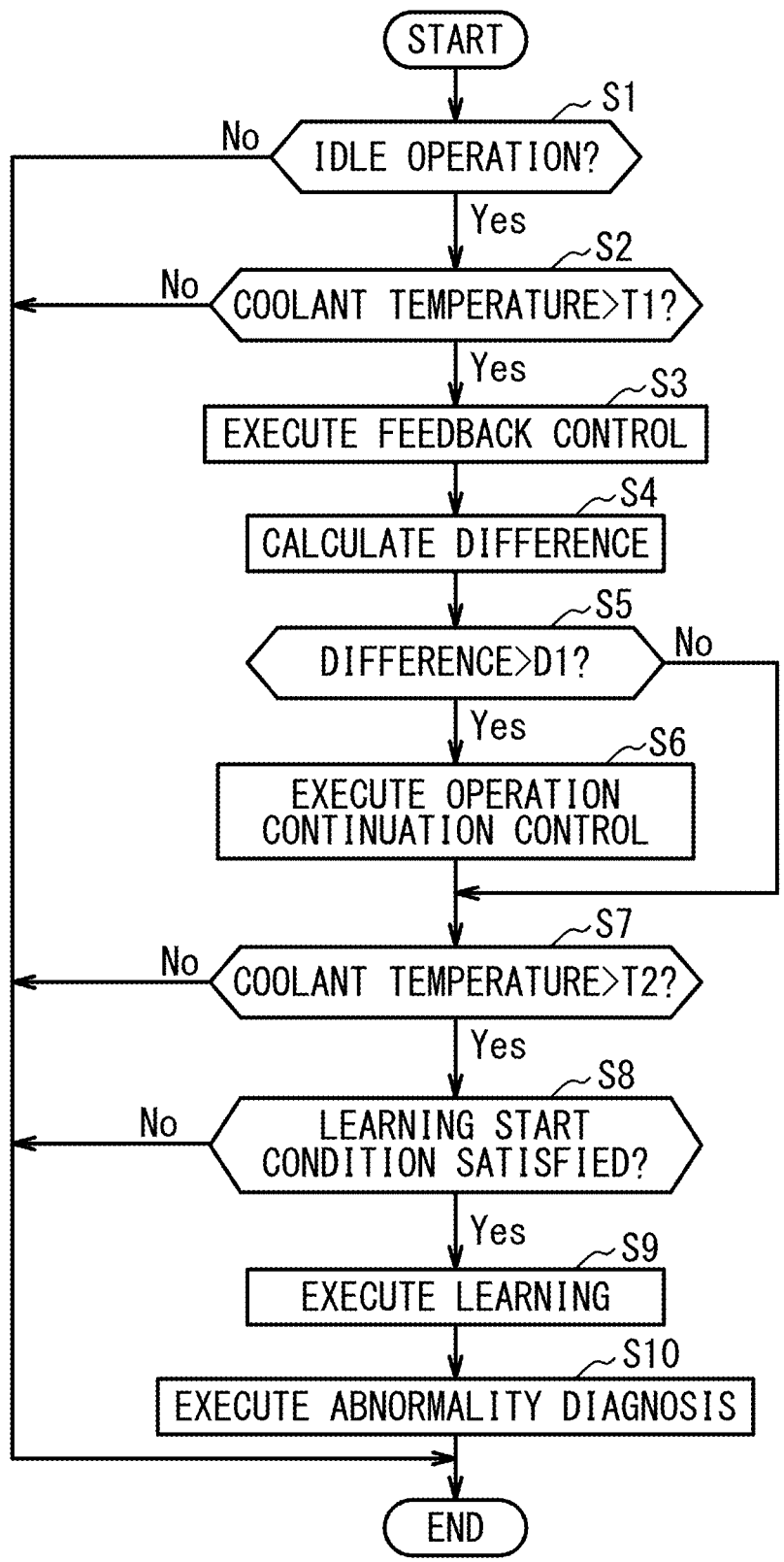
FIG. 3 is a flowchart illustrating an abnormality diagnosis process.

FIG. 3 is a flowchart illustrating an abnormality diagnosis process. This process is repeatedly executed at predetermined intervals in a state where the ignition is on. The ECU 100 determines whether or not the engine 10 is in idle operation (step S1). When a negative determination is made in step S1, the present control ends.

When an affirmative determination is made in step S1, the ECU 100 determines whether or not the water temperature is higher than the temperature T1 (step S2). The temperature T1 is set to an upper limit temperature at which the feedback control described below is stopped. The temperature T1 is a temperature lower than a temperature indicating completion of warm-up of the engine 10. When a negative determination is made in step S2, the present control ends. When an affirmative determination is made in step S2, the ECU 100 feedback-controls the control value of the engine 10 so that the actual rotational speed of the engine 10 becomes the target idle rotational speed (step S3). The control value includes, for example, a control value of a fuel injection amount, a control value of a throttle opening degree, a control value of an air-fuel ratio, and a control value of a fuel ignition timing.

Next, the ECU 100 calculates a difference between the actual rotational speed of the engine 10 and the target idle rotational speed (step S4). Next, the ECU 100 determines whether or not the magnitude of the difference is greater than the first upper limit value D1 (step S5). The first upper limit value D1 is set to an upper limit value indicating that the engine 10 is normal before completion of warm-up. When an affirmative determination is made in step S5, it is considered that there is a possibility that an abnormality has occurred in the engine 10. In this case, the ECU 100 executes operation continuation control for continuing the operation of the engine 10 (step S6). During execution of the operation continuation control, the ECU 100 continues the operation of the engine 10 even when there is a request to automatically stop the engine 10. Thus, the warm-up of the engine 10 is promoted, and the automatic stop of the engine 10 is avoided before the completion of the warm-up. When a negative determination is made in step S5, the above-described operation continuation control is not executed, and when there is a request for automatic stopping, the ECU 100 automatically stops the engine 10.

After execution of step S6 or in the case of No in step S5, the ECU 100 determines whether or not the water temperature is higher than the temperature T2 (step S7). The temperature T2 is set to a lower limit temperature at which it can be considered that the warm-up of the engine 10 is completed. When a negative determination is made in step S7, the present control ends. When an affirmative determination is made in step S7, the ECU 100 determines whether or not a learning start condition is satisfied (step S8). For example, when the engine 10 is driven and a predetermined time has elapsed from the start of the idle operation, it is considered that the learning start condition is satisfied. When a negative determination is made in step S8, the present control ends.

When an affirmative determination is made in step S8, the ECU 100 executes the learning of the control value described above (step S9). By executing the learning, the control value of the engine 10 is updated to the control value after the learning. Next, the ECU 100 executes an abnormality diagnosis of the engine 10 (step S10). When the operation continuation control is being executed in step S6, the ECU 100 stops the operation continuation control after completion of the abnormality diagnosis.

Figure 4:
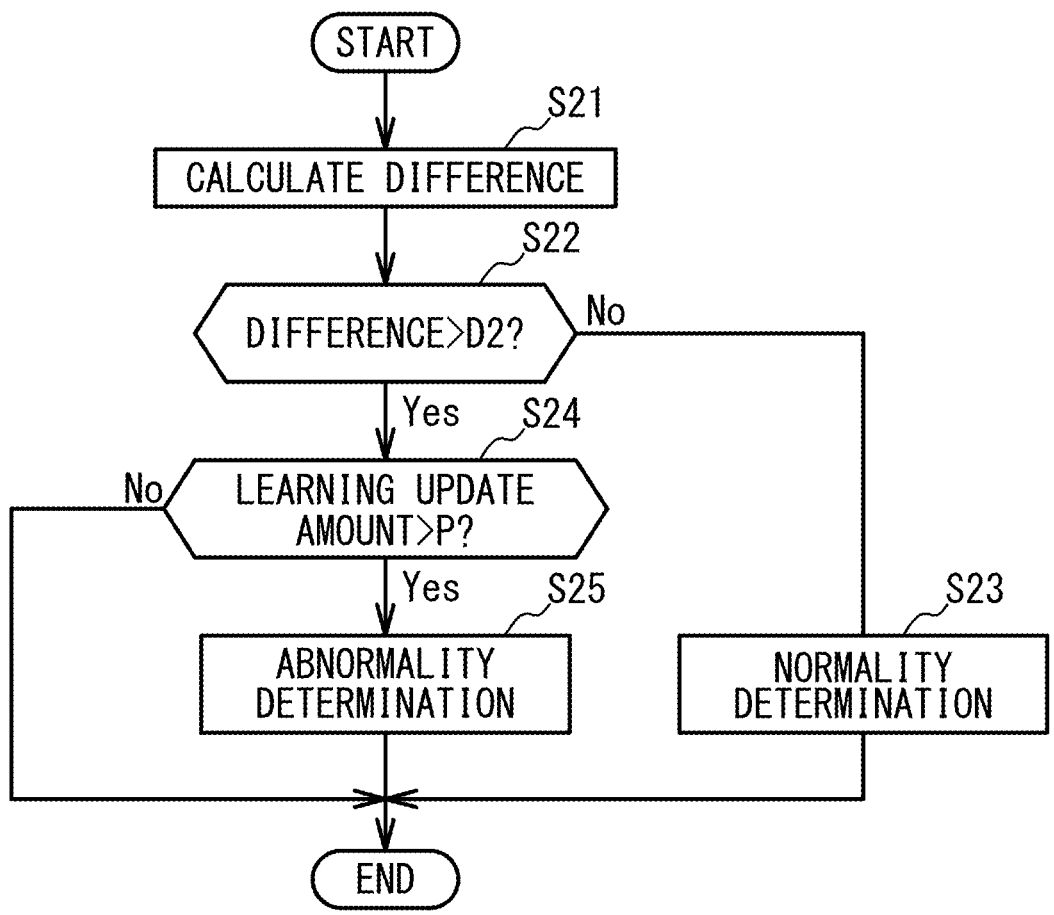
FIG. 4 is a flowchart illustrating the details of the abnormality diagnosis.

Next, the abnormality diagnosis will be specifically described. FIG. 4 is a flowchart illustrating details of the abnormality diagnosis. The ECU 100 recalculates a difference between the actual rotational speed of the engine 10 and the target idle rotational speed (step S21). Next, the ECU 100 determines whether or not the magnitude of the difference is greater than the second upper limit value D2 (step S22). The second upper limit value D2 is set to an upper limit value of a range in which the engine 10 is normal after completion of warm-up. The second upper limit value D2 may be the same as or different from the first upper limit value D1. When a negative determination is made in step S22, the ECU 100 determines that the engine 10 is normal (Step S23).

When an affirmative determination is made in step S22, the ECU 100 determines whether or not a learning update amount, which is a difference between an initial value of any of the control values described above and the learning value of the control value, is greater than a threshold value P (step S24). The threshold value P is determined for each of the fuel injection amount, the throttle opening degree, the air-fuel ratio, and the fuel ignition timing. The threshold value P is set to an upper limit value of a normal range of the learning update amount. When a negative determination is made in step S24, the present control ends. When an affirmative determination is made in Step S24, the ECU 100 determines that the engine 10 is abnormal (Step S25).

As described above, when the difference before completion of warm-up of the engine 10 is greater than the first upper limit value D1, the operation of the engine 10 is continued regardless of whether or not there is a request for automatic stop. Thus, the automatic stop of the engine 10 is avoided before the completion of the warm-up, and the execution frequency of the abnormality diagnosis of the engine 10 is ensured. This also makes it possible to avoid automatic stop of the engine 10 during execution of the abnormality diagnosis and before the diagnosis result is obtained.

When the difference before completion of warm-up of the engine 10 is equal to or less than the first upper limit value D1 and there is a request for automatic stop, the engine 10 is automatically stopped. As a result, when it can be there is a low possibility that an abnormality has occurred in the engine 10, the engine 10 is automatically stopped to ensure fuel economy.

Further, since the abnormality diagnosis is executed after the learning of the control value, the abnormality diagnosis is executed in a state where the operating state of the engine 10 is more stable. This improves the accuracy of the abnormality diagnosis is improved.

Although some embodiments of the present disclosure have been described in detail, the present disclosure is not limited to the specific embodiments but may be varied or changed within the scope of the present disclosure as claimed.

What is claimed is:

1. A hybrid vehicle, comprising:
an engine;
a motor; and
a control device configured to control the engine,
wherein the control device includes:
an intermittent operation control unit configured to automatically stop and automatically start the engine during traveling by the motor;
a feedback control unit configured to execute feedback control to control a control value of the engine such that an actual rotational speed of the engine becomes a target idle rotational speed during an idle operation of the engine;
a calculation unit configured to, in response to a temperature of a coolant of the engine being higher than a predetermined temperature, calculate a difference between the actual rotational speed and the target idle rotational speed during execution of the feedback control, wherein the predetermined temperature is set to an upper limit temperature at which the feedback control is stopped, and the predetermined temperature is lower than a temperature indicating completion of warm-up of the engine;
a determination unit configured to determine whether or not a magnitude of the difference is greater than a first upper limit value of a range indicating that the engine is normal before the completion of the warm-up of the engine;
a continuation unit configured to, in response to the determination unit determining that the magnitude of the difference is greater than the first upper limit value, continue operation of the engine regardless of presence or absence of a request for automatic stop of the engine;
a learning unit configured to execute learning of the control value; and
a diagnosis unit configured to execute an abnormality diagnosis of the engine, after the completion of the warm-up of the engine and after the learning of the control value,
wherein the diagnosis unit is further configured to determine that the engine is abnormal, in response to determining that
the magnitude of the difference after the completion of the warm-up of the engine is greater than a second upper limit value of a range indicating that the engine is normal after the completion of the warm-up of the engine, and
a learning update amount being a difference between an initial value of the control value and a learning value of the control value is greater than a threshold value, wherein the threshold value is set to an upper limit value of a normal range of the learning update amount.

2. The hybrid vehicle according to claim 1, wherein the intermittent operation control unit is further configured to automatically stop the engine, in response to
the determination unit determining that the magnitude of the difference is not greater than the first upper limit value, and
a request for automatic stop of the engine.

3. The hybrid vehicle according to claim 2, wherein the diagnosis unit is further configured to determine that the engine is normal, in response to determining that the magnitude of the difference after the completion of the warm-up of the engine is not greater than the second upper limit value.

4. The hybrid vehicle according to claim 3, wherein the control value of the engine is a control value of at least one of a fuel injection amount, a throttle opening degree, an air-fuel ratio, or a fuel ignition timing.

5. The hybrid vehicle according to claim 4, wherein the threshold value is determined for the at least one of the fuel injection amount, the throttle opening degree, the air-fuel ratio, or the fuel ignition timing.

* * * * *